United States Patent [19]
Arechavaleta

[11] 3,874,834
[45] Apr. 1, 1975

[54] CONTINUOUS EXTRUSION MACHINE FOR MANUFACTURING PLASTIC NETS

[75] Inventor: Ignacio Aurrecoechea Arechavaleta, Bilbao, Spain

[73] Assignee: Triker S.A., Bilbao, Spain

[22] Filed: Mar. 16, 1973

[21] Appl. No.: 341,880

[30] Foreign Application Priority Data
Mar. 21, 1972 Spain .................................. 401037

[52] U.S. Cl.............. 425/132, 425/382 N, 425/463, 264/DIG. 81
[51] Int. Cl......................... B29d 23/04, B29f 3/04
[58] Field of Search ....... 425/132, 384 N, 462, 463; 264/167, DIG. 81

[56] References Cited
UNITED STATES PATENTS

| | | | |
|---|---|---|---|
| 3,308,220 | 3/1967 | Smith | 264/167 |
| 3,538,545 | 11/1970 | Smith | 264/167 R X |
| 3,674,898 | 7/1972 | Larsen | 264/167 X |
| 3,725,518 | 4/1973 | Gaffney | 264/167 X |

FOREIGN PATENTS OR APPLICATIONS 44-23156  10/1969  Japan................................ 264/167

Primary Examiner—R. Spencer Annear
Attorney, Agent, or Firm—Ostrolenk, Faber, Gerb & Soffen

[57] ABSTRACT

An extrusion die with two sets of slots for extruding filaments and said die including a rotatable element for connecting the supply of material to be extruded with one set of slots and then with the successive sets of slots, thereby producing a latticework filament arrangement, as material is extruded through successive slots by rotation of said die; in one embodiment, the material to be extruded through each set of slots is fed from a different supply.

16 Claims, 8 Drawing Figures

CONTINUOUS EXTRUSION MACHINE FOR MANUFACTURING PLASTIC NETS

DESCRIPTIVE REPORT

The invention refers to an extrusion machine for plastic materials and more definitely, to a new continuous-extrusion head which is specifically designed to manufacture nets out of plastic materials.

The continuous-extrusion head performs a new procedure for combining sections of plastic material with a reciprocating die. Such a process has been the object of Spanish application No. 396,734, of November 6, 1971 the name of this same applicant, which corresponds to my U.S. application Ser. No. 305,927, filed Nov. 13, 1972. The present invention concerns a novel die element for the extrusion die.

The invention is now described in connection with the accompanying drawings:

FIG. 1 is a cross sectional elevational view of the continuous-extrusion head of the invention. It is comprised of several easily machined parts. All of the parts are turned and can therefore be obtained by means of machining with a lathe.

Figure 1:
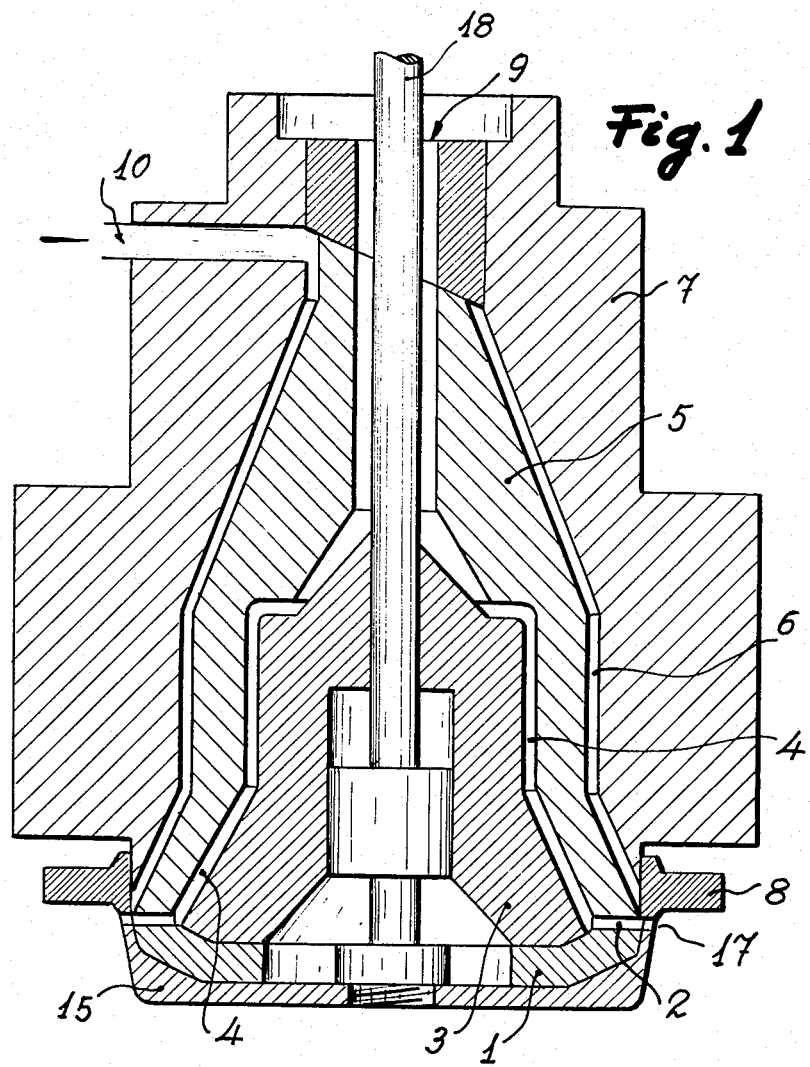

A detailed explanation of each reference numeral and the element it identifies appears at the end of this specification. The following material explains the construction and operation of the invention. An outer die 15 according to the invention rests on inner die 1. Die 15 possesses the following features:

a. It rests directly on inner die 1.
b. The number of its plastic flow slots 17 in die 15 is exactly one half the number of those slots in die 1, i.e., the number of slots 2 is twice that of slots 17.
c. Slots 17 line up with alternate slots 2. Periodically die 15 rotates so that each slot 17 lines up with an alternate slot 2 that was previously blocked.
d. The rotation of die 15 is synchronized exactly with the lifting motion of die 8.

The continuous-extrusion machine of the invention is comprised of five dies. Dies 1, 5 and 7 are stationary. Dies 8 and 15 are movable, with their movements being synchronized. Vertical reciprocation of die 8 determines whether or not the material flows through duct 6. Die 15, by turning, lines up its slots 17 with alternate slots 2. Filaments of material flow through slots 4 and exit alternately through one half of the slots 2, during one phase of operation and, in the immediately following phase, material flows through the alternate slots lying between the first ones.

Figure 5:
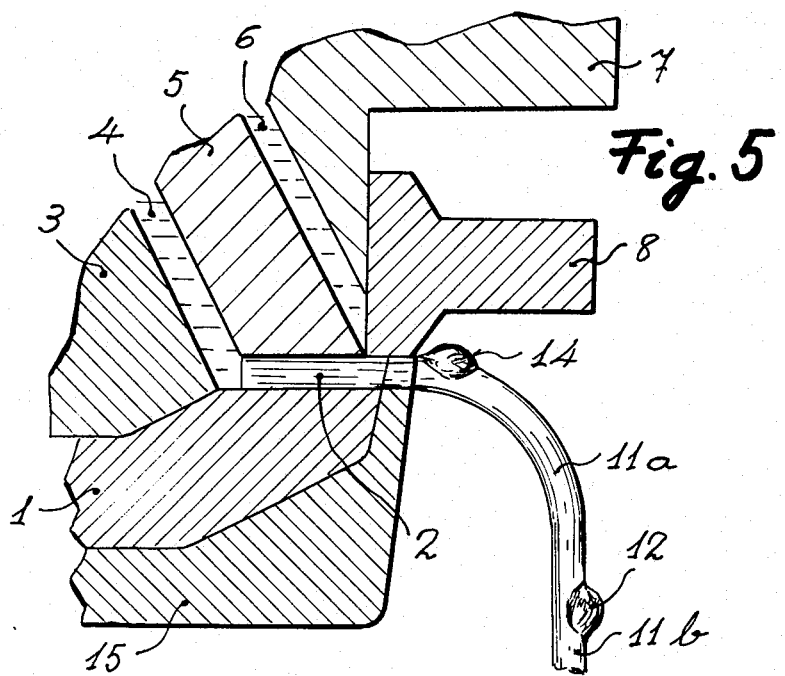
FIG. 5 is a detail, cross sectional view of the type of FIG. 4 showing the dies in another orientation.
Figure 6:
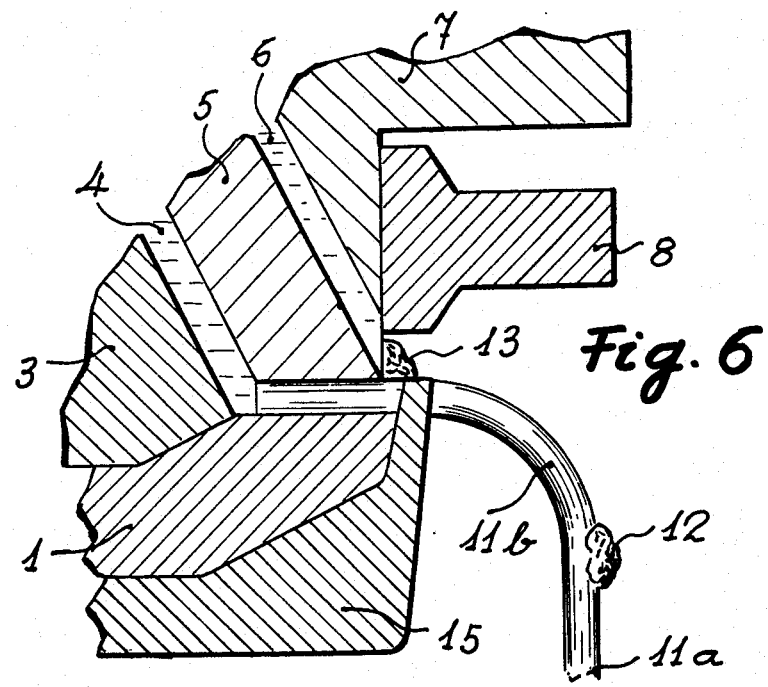
FIG. 6 is the view showing the dies at yet another orientation.

In this way, shown in FIGS. 5 and 6, the filaments which pass through slots 2 in one phase are those indicated with 11a. In the next phase, after the slight rotation of die 15, filaments 11b, pass through other slots 2.

OPERATION.- The molten plastic material comes from independent extruders to separate ducts 9 and 10. It flow through the extruder head and flows through ducts 4 and 6 seeking the corresponding outlets.

The plastic material from duct 9 exits through slots 2, after traveling through ducts 4. It flows through those ducts 4 which at that moment are lined up with the corresponding ducts 17 of die 15.

Filaments do not flow continuously through slots 2 and 17 because of the following: The plastic material flows through a first set of alternate slots 2, the ones that are then lined up with one set of slots 17. As die 15 is turning, all outflow of plastic material through slots 2 is temporarily interrupted. Once this slight turn of die 15 is completed, slots 17 align with the alternate slots 2 that previously did not allow the plastic to flow. The plastic material now flows through the new set of slots 2. The filaments 1 which come out from one phase to another are offset according to how great the separation between each one of slots 2.

Of course, these filaments which pass through slots 2 must thereafter pass through the aligned slots 17. The section of the netting produced will be the same as the sections of the last outflow slots 17 through which the plastic passed. These slots 17 may be equal or unequal with regard to one another depending on the type of net to be manufactured.

Both die 1 and die 15 can be easily replaced. Only the idea that the number of slots in 2 is always twice that of the slots in 17 shall be retained without change. The number of slots can be changed and their separation, can be changed. Thus, with a single extruder head, it is possible to manufacture different types of nets which will be produced with a tubular shape and when the nets are cut along the generatrix, they will give rise to sheets with a definite width dependent upon the diameter of the dies.

Figure 2:
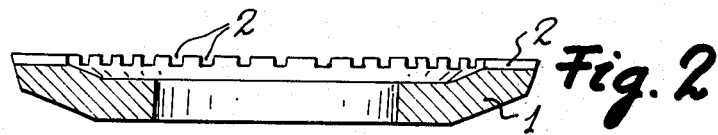
FIG. 2 is a detail, side elevational view of the inner plate or die of FIG. 1.

The molten plastic material that passes through ducts 10 and 6 is periodically stopped by virtue of the movable die 8. Die 8 is moved by a piston (not shown) which operates with reciprocating movements synchronized with the rotation of die 15 which will also be alternating with the same frequency. Inner plate 1 of FIG. 2 has several slots with an appropriate section to give the filaments passing therethrough a desired shape and also appropriate separation the filaments the desired spacing apart. Die 1 is fastened to die 3, but it is simple to replace.

Plastic material is always flowing through half of the slots 2. At one phase, one half of the slots are used and in the immediately following phase, said material flows through the other half of the slots.

Figure 3:
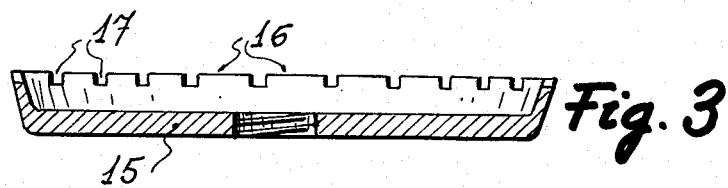
FIG. 3 is a detail, side elevational view of the outer plate or die of FIG. 1.

Outer plate 2 of FIG. 3 has exactly half the number of slots that the plate or die 1 has.

It is through these slots 17 of the plate 2 that plastic material is always flowing. This plate or die is periodically rotated, thus every time lining up its slots 17 with slots 2 different from the preceding ones which are offset.

This periodic turning operation determines that at one time the exiting filaments will be (11a) and the next time they will be (11b). As noted in the illustration of the final product of the netting (FIGS. 7 and 8), these filaments 11a and 11b are not extensions of each other, but rather are offset or are merely non-aligned.

Figure 4:
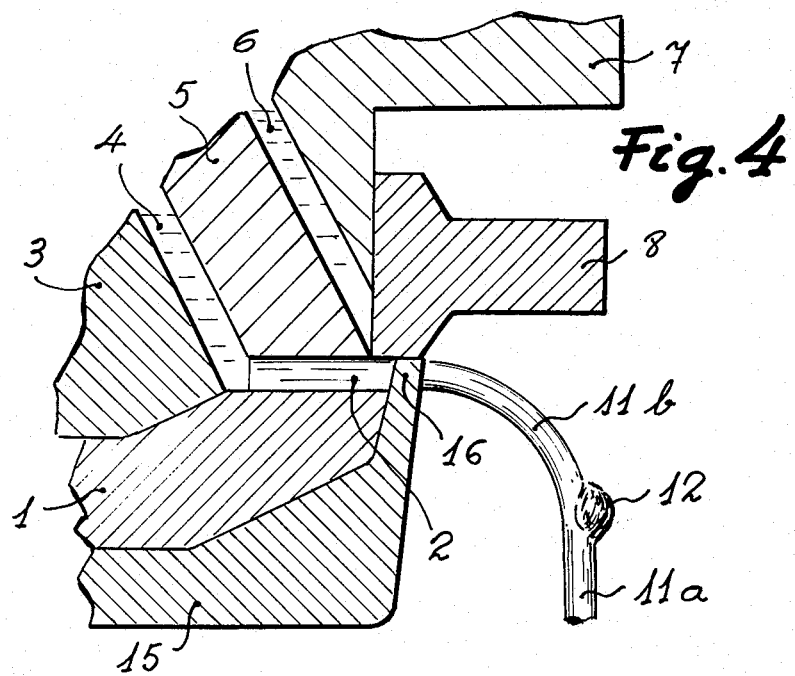
FIG. 4 is a fragmentary detail view of the head of FIG. 1, showing a first position of the extruded filaments.

In the position of FIG. 4, filaments 11b are allowed to come out. In the illustration it appears as if die 15 is blocking the outlet of the plastic filaments 11b. But the section through a blocked slot 2 is being shown in FIG. 4. The two slots 2 at both sides of the illustrated one allow the filaments to flow out according to 11b.

After a plastic ring 14 is deposited because of die 8 is lifting in the manner shown in FIG. 6, then the die 15 is rotated. As shown then in Flg. 5, the plastic material immediately flows through these slots 2 that in the FIG. 4 position of die 15 had appeared blocked.

Now, filament 11a flows through the ducts 2 that alternate with the ducts that produced the previous filaments 11b.

FIG. 6 shows how die 8 moves upward to let pass, over its entire perimeter, a plastic ring 13. Ring 13 joins all filaments 11b which have just flowed out. Thereafter the extruder head will go to the position of FIG. 5 already commented on:

Simultaneously with the lifting of die 8, die 15 is rotating or moving angularly to produce the offset of the outflow of the preceding filaments.

Figure 7:
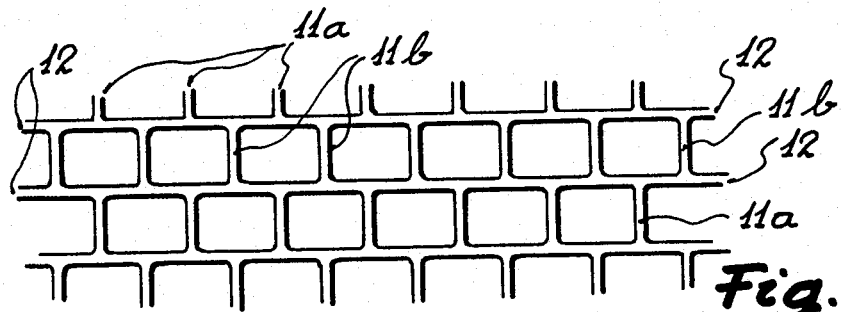
FIG. 7 shows an example of finished netting obtained with the die of the invention.

The finished netting in FIG. 7 has been represented in an ideal form; when the tension of its own weight is neutralized, netting with square or rectangular openings is obtained.

Figure 8:
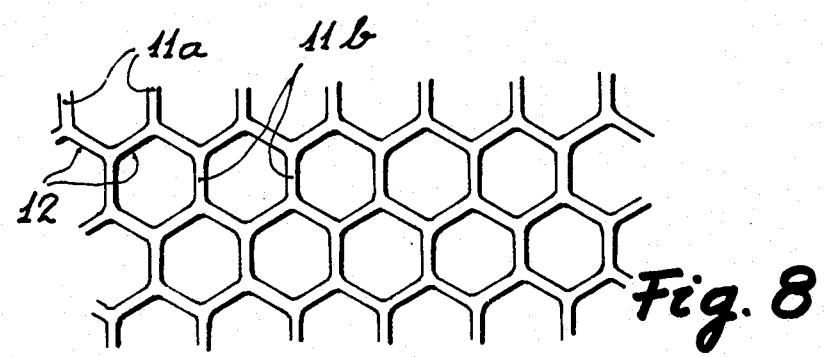
FIG. 8 shows another example of finished netting obtained with the die of the invention.

The finished netting of FIG. 8 has the lattice openings with a hexagonal shape which is brought about by putting under tension or therefore deforming on purpose the filaments which have a ring shape 12, 13 and then by varying this tension to a greater or lesser degree and the rhythm with which the ring-shaped filaments 12, 13 are deposited. Openings can be obtained in the netting with all sorts of unusual shapes, but the openings always tend toward the shape of a hexagon.

The elements identified by the reference numerals are now identified and explained. Number 1 indicates the inner die which can be replaced and which, as can be observed in FIG. 2, has a predetermined even number of slots.

Number 2 indicates the slots in the stationary inner die 1 through which slots the plastic material flows in alternating manner, some times through alternate slots and other times through the other half of the slots which lie between the first ones.

Number 3 designates the die, also stationary, which together with die 5 defines the outflow duct for the plastic material which enters from duct 9.

Number 4 indicates the duct through which the plastic material flows and which is formed between dies 3 and 5. Die 5 is also stationary, and together with die 3, determines through which ducts 4 the plastic will flow. Against said die 5 the slots 2 of front die 1 line up and are closed by it on top.

Number 6 indicates a slot or passage for flow of plastic material which is formed by the alignment of die 5 and the outside die 7, also stationary, which makes up the outside body of the extruder head. Internally, duct 6 is defined with the alignment of die 5.

Number 8 indicates the movable die. While die 8 is up, it allows the material which flows through the ring duct 6 to flow free. Downward movement of die 8, causes an automatic and immediate closing of duct 6 and controls the output of plastic rings as can be observed in FIG. 6. During the time in which this movement of die 8 takes place, the other movable die 1 moves to change the flow of the plastic from one half of the slots 2 to the alternate half.

Number 9 shows the feeding duct from an extruder of the plastic material. Duct 9 can be completely independent from duct 10. This makes it possible, as a consequence, to combine two kinds of material which may possess different mechanical properties as well as different ornamental properties. The colors can therefore be varied.

Number 10 shows an independent feed duct. It is the feeding that takes place through duct 10 that governs the outlfow of plastic of filaments 11a and 11b which are the ones which pass through slots 2 first and finally through slots 17.

Number 11a indicates the vertical filaments which always flow through slots 17. Their cross sectional shape can be adjusted to the different demands of the netting to be manufactured. According to how the alignment is made, these filaments come out through those slots 2 that are then aligned with slots 17.

Number 11b indicates those filaments that, when die 15 has rotated, move through slots 2 that are aligned with those slots 17 whose openings were previously blocked by areas 16.

Number 12 designates the plastic rings that are formed at the moment die 8 is lifted. During the time interval of the lifting of die 8 and the consequent deposition of the ring 13, as noted above die 15 is being rotated.

Number 13 shown in FIG. 6, depicts the moment at which the ring is deposited, when movable die 8 is elevated.

Number 14 indicates the already-carried-out deposition of the ring and the advance of the production of the netting; this detail is noted in FIG. 5. Then, once filaments 11a have been made, the filaments lined up with the preceding filaments 11b will appear again.

Number 15 designated the rotatable die, which will turn angularly, to define the passages for exit from slots 2. The turning movement of die 15 takes place when die 8 is up.

Number 16 indicates the areas that block those slots 2 that are not then lined up with slots 17 of this die 15 previously commented on.

The number of slots 17 is exactly half that of slots 2.

With 18 the shaft which controls the rotation motion of the die 15 is indicated. This shaft is rotated in the way most appropriate for each case.

It will be easily understood after studying the drawings and the foregoing description that this design offers a simple and effective construction which can be very easily carried out, thus ensuring that its manufacture will be relatively inexpensive.

It is repeated that in the object constituted by this invention all those modifications of detail that circumstances and practice might make advisable may be introduced providing that the spirit of the invention described is not changed, altered or modified by the variations introduced.

I claim:

1. A continuous extrusion machine for manufacturing a continuous net like mesh, which mesh is comprised of a first array of spaced apart filaments generally extending in a first direction, a second array of spaced apart filaments generally extending in said first direction and all of the filaments of the second array being generally offset in said first direction from filaments in the first array and individual filaments of the second array being offset sideways from the adjacent individual ones of the first array of filaments, and a third array of spaced apart filaments, each extending transversely to and intersecting both of a first and a second array of filaments and serving to separate those first and second arrays of filaments along said first direction;

said machine comprising:

a housing defining and surrounding a pressure chamber;

a first plurality of filament sized outlets from said pressure chamber arrayed in a row and spaced apart predetermined distances;

a die element disposed adjacent to said first outlets and having a second plurality of filament sized outlets arrayed in a respective row and spaced apart respective predetermined distances; the spacing apart of at least some of said second outlets differs from the spacing apart of at least some of said first outlets;

individual ones of said first and said second outlets being shaped to be selectively aligned to permit passage of material therethrough and to be selectively misaligned so as to block such passage; said first and said second outlets being positioned to enable selective alignment of individual ones of said first and said second outlets;

means for moving said die element with respect to said first outlets for selectively aligning a first group of said first outlets with a first group of said second outlets while misaligning a second group of said first outlets with a second group of said second outlets, and for thereafter aligning said second group of said first outlets with said second group of said second outlets while misaligning said first group of said first outlets with said first group of said second outlets;

a third outlet from said pressure chamber; said third outlet being shaped so as to cause extrusion of a filament of the third array of filaments each time said third outlet is open; said third outlet being positioned sufficiently close to said first and second outlets as to deposit material extruded from said third outlet on the material extruded from the aligned said groups of said first and said second outlets after the material has been extruded;

blocking means movable between a first position which blocks said third outlet and a second position which unblocks said third outlet.

2. A continuous extrusion machine for manufacturing a continuous net like mesh, which mesh is comprised of a first array of spaced apart filaments generally extending in a first direction, a second array of spaced apart filaments generally extending in said first direction and all of the filaments of the second array being generally offset in said first direction from filaments in the first array and individual filaments of the second array being offset sideways from the adjacent individual ones of the first array of filaments, and a third array of spaced apart filaments, each extending transversely to and intersecting both of a first and a second array of filaments and serving to separate those first and second arrays of filaments along said first direction;

said machine comprising:

a housing defining and surrounding a pressure chamber;

a first plurality of filament sized outlets from said pressure chamber arrayed in a row and spaced apart predetermined distances;

a die element disposed adjacent to said first outlets and having a second plurality of filament sized outlets arrayed in a respective row and spaced apart respective predetermined distances; the number of said second outlets differs from the number of said first outlets;

individual ones of said first and said second outlets being shaped to be selectively aligned to permit passage of material therethrough and to be selectively misaligned so as to block such passage; said first and said second outlets being positioned to enable selective alignment of individual ones of said first and said second outlets;

means for moving said die element with respect to said first outlets for selectively aligning a first group of said first outlets with a first group of said second outlets while misaligning a second group of said first outlets with a second group of said second outlets, and for thereafter aligning said second group of said first outlets with said second group of said second outlets while misaligning said first group of said first outlets with said first group of said second outlets;

a third outlet from said pressure chamber; said third outlet being shaped so as to cause extrusion of a filament of the third array of filaments each time said third outlet is open; said third outlet being positioned sufficiently close to said first and second outlets as to deposit material extruded from said third outlet on the material extruded from the aligned said groups of said first and said second outlets after the material has been extruded;

blocking means movable between a first position which blocks said third outlet and a second position which unblocks said third outlet.

3. The continuous extrusion machine of claim 2, wherein said housing is generally annular in shape and has an annular periphery; said first, second and third outlets all exit to said annular periphery of said housing.

4. The continuous extrusion machine of claim 3, wherein said blocking means is around the outside of said housing annular periphery and of said third outlet and is movable with respect to said housing.

5. The continuous extrusion machine of claim 3, wherein the aligned said groups of said first and said second outlets both exit from said housing at respective locations and said third outlet exits from said housing adjacent to and above said locations.

6. The continuous extrusion machine of claim 3, wherein said chamber is comprised of a first pressure chamber communicating with said first and second outlets for delivering extrudible material through the said aligned groups of said first and second outlets and comprises a second separate pressure chamber communicating with said third outlet.

7. The continuous extrusion machine of claim 3, wherein said die element and its said second outlets are disposed on the outside of said first outlets.

8. The continuous extrusion machine of claim 7, wherein said means for shifting said die element with respect to said first outlets comprises means for rotating said die element with respect to the annular axis of said housing.

9. The continuous extrusion machine of claim 2, wherein there are more of said first outlets than there are said second outlets.

10. The continuous extrusion machine of claim 9, wherein said first and said second groups of said second outlets are identical.

11. The continuous extrusion machine of claim 9, wherein said first and said second outlets are both respectively uniformly spaced apart annularly around said housing annular periphery.

12. The continuous extrusion machine of claim 9, wherein there are twice as many said first outlets as said second outlets.

13. The continuous extrusion machine of claim 12, wherein said housing is generally annular in shape and said first, second and third outlets all exit to the annular periphery of said housing.

14. The continuous extrusion machine of claim 13, wherein said first and said second outlets are both respectively uniformly spaced apart annularly around said housing annular periphery.

15. The continuous extrusion machine of claim 14, wherein said first and said second groups of said second outlets are identical.

16. The continuous extrusion machine of claim 13, wherein said means for moving said die element with respect to said first outlets comprises means for rotating said die element with respect to the annular axis of said housing.

* * * * *